United States Patent
Singh (10) Patent No.: US 11,741,267 B2
(45) Date of Patent: Aug. 29, 2023

(54) CONSENSUS METHOD FOR A DISTRIBUTED DATABASE

(71) Applicant: Siemens Aktiengesellschaft, Munich (DE)

(72) Inventor: Saurabh Narayan Singh, Bayern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/011,620

(22) PCT Filed: Jun. 21, 2021

(86) PCT No.: PCT/EP2021/066788
§ 371 (c)(1),
(2) Date: Dec. 20, 2022

(87) PCT Pub. No.: WO2022/002658
PCT Pub. Date: Jan. 6, 2022

(65) Prior Publication Data
US 2023/0185969 A1  Jun. 15, 2023

(30) Foreign Application Priority Data
Jun. 29, 2020 (EP) .................................. 20182882

(51) Int. Cl.
H04L 9/06 (2006.01)
G06F 21/64 (2013.01)
H04L 67/1097 (2022.01)

(52) U.S. Cl.
CPC .......... *G06F 21/64* (2013.01); *H04L 67/1097* (2013.01); *G06F 2201/80* (2013.01)

(58) Field of Classification Search
CPC ... G06F 21/64; G06F 2201/80; H04L 67/1097
See application file for complete search history.

(56) References Cited

U.S. PATENT DOCUMENTS

2001/0007091 A1  7/2001  Walter et al.
2003/0002562 A1  1/2003  Yerlikaya
(Continued)

FOREIGN PATENT DOCUMENTS

CN  111929569 A   11/2020
DE  69907930 T2    5/2004
(Continued)

OTHER PUBLICATIONS

PCT International Search Report and Written Opinion of International Searching Authority dated Sep. 24, 2021 corresponding to PCT International Application No. PCT/EP2021/066788 filed Jun. 21, 2021.

*Primary Examiner* — Vance M Little
(74) *Attorney, Agent, or Firm* — Schmeiser, Olsen & Watts LLP (57) ABSTRACT

A method for obtaining a valid global state for a distributed database, wherein the distributed database includes main nodes storing a complete dataset, and a plurality of subsets of nodes configured to store a part of the dataset, including: a. receiving a request for providing a valid global state of the distributed database, b. determining a first local state for each subset based on status information of nodes of the respective subset regarding the respective part of the dataset, c. combining these first local states of all subsets to a first combined state, d. determining a global state by the main nodes based on status information of the main nodes regarding the stored dataset, e. verifying the first combined state by matching the first combined state with the global state and f. outputting the first combined state as valid global state for the distributed database depending on the verification.

11 Claims, 5 Drawing Sheets

(56) References Cited

U.S. PATENT DOCUMENTS

| | | | | |
|---|---|---|---|---|
| 2008/0046752 A1* | 2/2008 | Berger | ................ | H04L 9/3271 |
| | | | | 713/186 |
| 2009/0030986 A1* | 1/2009 | Bates | ................ | G06F 11/2074 |
| | | | | 709/205 |
| 2017/0262519 A1* | 9/2017 | Horowitz | ............ | G06F 11/1458 |
| 2019/0220603 A1* | 7/2019 | Gopalakrishnan | ...... | G06F 21/64 |
| 2019/0392118 A1* | 12/2019 | Elden | ...................... | G06F 21/64 |
| 2020/0076571 A1* | 3/2020 | Natarajan | ........... | G06F 16/2246 |
| 2020/0195441 A1* | 6/2020 | Suen | .................... | H04L 9/3236 |
| 2020/0265031 A1* | 8/2020 | Greven | .............. | H04L 67/1097 |
| 2021/0056562 A1* | 2/2021 | Hart | ....................... | G06F 16/27 |
| 2021/0117410 A1* | 4/2021 | Sekniqi | .............. | G06F 16/2379 |

FOREIGN PATENT DOCUMENTS

| | | |
|---|---|---|
| DE | 102019104084 A1 | 8/2020 |
| DE | 102019206859 A1 | 11/2020 |
| EP | 3596684 A2 | 1/2020 |
| WO | WO 2019/101230 A2 | 5/2019 |

* cited by examiner

CONSENSUS METHOD FOR A DISTRIBUTED DATABASE

CROSS-REFERENCE TO RELATED APPLICATIONS

This application claims priority to PCT Application No. PCT/EP2021/066788, having a filing date of Jun. 21, 2021, which claims priority to EP Application No. 20182882.9, having a filing date of Jun. 29, 2020, the entire contents both of which are hereby incorporated by reference.

FIELD OF TECHNOLOGY

The following relates to a computer-implemented consensus method for obtaining a valid global state of a distributed database, a computer program product for performing the steps of said method, a distributed database, a broadcasting node, and a verification node.

BACKGROUND

The technology of blockchains or "distributed ledgers" is currently a hotly discussed technology that can, in particular, be realized as a distributed database system. Besides applications for local payment systems (e.g., Bitcoin), new application technologies are being developed. In particular, transactions between firms can therefore be performed in a manner protected against manipulation without a mediator or clearing house. This allows new business models without a trusted mediator and reduces transaction costs, and new digital services can be provided flexibly without having to establish trust relationships and an infrastructure that has been set up specifically for the digital services.

In case of decentralized distributed databases, by design, there is no central entity or authority which can control and govern the mechanism. This lack of central governing entity makes the use of normal crash fault tolerant consensus algorithms in a decentralized distributed database a security risk, as any malicious node can propose an incorrect message intentionally and the system would not be able to act against it. A *byzantine* fault tolerant (BFT) algorithm makes sure that all the nodes in the distributed system agree on the state of the distributed system. In case there is a malicious node, which is transferring an incorrect message to be agreed upon, rest of the system has a tolerance to such nodes, albeit to an extent.

However, one issue in BFT consensus algorithm driven distributed decentralized databases is the communication complexity of such consensus algorithms. For a number of nodes N it is of the order $O(N^2)$. This leads to lower throughput, and the added constraint that such networks tend to perform much poorly as the number of nodes participating in the system grows. This can lead to overall low performance and throughput of the decentralized distributed databases. These restrictions affect the successful widespread adoption of BFT algorithms.

SUMMARY

An aspect relates to define a BFT consensus method which improves the performance of a distributed database.

The invention provides according to a first aspect a computer-implemented consensus method for obtaining a valid global state for a distributed database, wherein the distributed database comprises main nodes, each main node storing a complete dataset, and a plurality of subsets of nodes, each subset configured to store a part of the dataset, the method comprising the steps:

a. receiving a request for providing a valid global state of the distributed database,
b. determining a first local state for each subset based on status information of nodes of the respective subset regarding the respective part of the dataset,
c. combining these first local states of all subsets to a first combined state,
d. determining a global state by the main nodes based on status information of the main nodes regarding the stored dataset,
e. verifying the first combined state by matching the first combined state with the global state generating a verification result,
and
f. outputting the first combined state as valid global state for the distributed database depending on the previously generated verification result.

A consensus method can be understood as the mechanism by which nodes of a distributed network reach consensus, i.e., agree for example on a state of a transaction or dataset. Since decentralized systems, and do not rely on a central instance, the decentralized nodes therefore agree on the validity of transactions. A consensus method therefore ensures compliance with protocol rules and guarantees that all transactions are processed reliably.

Unless indicated otherwise in the description below, the terms "perform", "calculate", "computer-aided", "compute", "discover", "generate", "configure", "reconstruct", "select", and the like relate to actions and/or processes and/or processing steps that alter and/or produce data and/or that convert data into other data, the data being able to be presented or available as physical variables, in particular, for example as electrical impulses. In particular, the expression "computer" should be interpreted as broadly as possible in order to cover in particular all electronic devices having data processing properties.

Computers can therefore be for example personal computers, servers, programmable logic controllers (PLCs), handheld computer systems, Pocket PC devices, mobile radios and other communication devices that can process data in computer-aided fashion, processors and other electronic devices for data processing.

Within the context of embodiments of the invention, "computer-aided" can be understood to mean for example an implementation of the method in which in particular a processor carries out at least one method step of the method. Within the context of embodiments of the invention, a processor can be understood to mean for example a machine or an electronic circuit. A processor can be in particular a central processing unit (CPU), a microprocessor or a microcontroller, for example an application-specific integrated circuit or a digital signal processor, possibly in combination with a memory unit for storing program instructions, etc. A processor can, by way of example, also be an IC (integrated circuit), in particular an FPGA (field programmable gate array) or an ASIC (application-specific integrated circuit), or a DSP (digital signal processor) or a graphics processor GPU (graphics processing unit). A processor can also be understood to mean a virtualized processor, a virtual machine or a soft CPU. It can, by way of example, also be a programmable processor that is equipped with configuration steps for carrying out the method according to embodiments of the invention or that is configured by configuration steps such that the programmable processor realizes the features according to embodiments of the invention for the method, the component, the modules or other aspects and/or sub-aspects of embodiments of the invention.

Within the context of embodiments of the invention, a "module" can be understood to mean for example a processor and/or a memory unit for storing program instructions. By way of example, the processor is configured specifically to execute the program instructions such that the processor performs functions to implement or perform the method according to embodiments of the invention or a step of the method according to embodiments of the invention.

Within the context of embodiments of the invention, "assign", in particular in regard to data and/or information, can be understood to mean for example computer-aided assignment of data and/or information. By way of example, a second datum is assigned to a first datum in this regard by a memory address or a unique identifier (UID), e.g., by storing the first datum together with the memory address or the unique identifier of the second datum together in a data record.

Within the context of embodiments of the invention, "provide", in particular in regard to data and/or information, can be understood to mean for example computer-aided provision. Provision is effected for example via an interface (e.g., a database interface, a network interface, an interface to a memory unit). This interface can be used for example to convey and/or send and/or retrieve and/or receive applicable data and/or information during the provision. Within the context of embodiments of the invention, "provision" can also be understood to mean for example loading or storing, for example of a transaction containing applicable data. This can, by way of example, be effected on or by a memory module. "Provision" can also be understood to mean for example transmitting (or sending or conveying) of applicable data from one node to another node of the blockchain or of the distributed database system (or the infrastructure thereof).

Within the context of embodiments of the invention, a "checksum", for example a data block checksum, a data checksum, a node checksum, a transaction checksum, a concatenation checksum or the like, can be understood to mean for example a cryptographic checksum or cryptographic hash or hash value, which are formed or calculated, in particular by a cryptographic hash function, for a data record and/or data and/or data and/or one or more of the transactions and/or a subregion of a data block (e.g., the block header of a block of a blockchain or data block header of a data block of the distributed database system or only some of the transactions of a data block). A checksum can be in particular a checksum/s or hash value/s of a hash tree (e.g., Merkle tree, Patricia tree). Furthermore, it can, in particular, also be understood to mean a digital signature or a cryptographic message authentication code. The checksums can, by way of example, be used to provide cryptographic protection/protection against manipulation for the transactions and the data stored therein on different levels of the database system. If for example a high level of security is called for, the checksums are produced and checked at transaction level, for example. If a lower level of security is called for, the checksums are produced and checked at block level (e.g., for the entire data block or for only some of the data block and/or some of the transactions), for example.

Within the context of embodiments of the invention, a "data block checksum" can be understood to mean a checksum that for example is calculated for some or all transactions of a data block. A node can then, by way of example, check/discover the integrity/authenticity of the applicable part of a data block by the data block checksum. Additionally or alternatively, the data block checksum may in particular also have been formed for transactions of a preceding data block/predecessor data block of the data block. This data block checksum can in particular also be realized by a hash tree, for example a Merkle tree or a Patricia tree, wherein the data block checksum is in particular the root checksum of the Merkle tree or of a Patricia tree or of a binary hash tree. In particular, transactions are safeguarded by further checksums from the Merkle tree or Patricia tree (e.g., by using the transaction checksums), wherein in particular the further checksums are leaves in the Merkle tree or Patricia tree. The data block checksum can thus for example safeguard the transactions by virtue of the root checksum being formed from the further checksums. The data block checksum can, in particular, be calculated for transactions of a specific data block of the data blocks. In particular, such a data block checksum can be adopted in a succeeding data block of the specific data block in order to concatenate this succeeding data block with its preceding data blocks, for example, and in particular thus to make an integrity of the distributed database system checkable. This allows the data block checksum for example to undertake the function of the concatenation checksum or to be adopted in the concatenation checksum. The header of a data block (e.g., of a new data block or of the data block for which the data block checksum has been formed) can comprise the data block checksum, for example.

Within the context of embodiments of the invention, a "transaction checksum" can be understood to mean a checksum that is in particular formed for a transaction of a data block. Additionally, for example a calculation of a data block checksum for an applicable data block can be speeded up, since for example already calculated transaction checksums can immediately be used as leaves e.g., of a Merkle tree for this purpose. Within the context of embodiments of the invention, a "concatenation checksum" can be understood to mean a checksum that, in particular, indicates or references the preceding data block of the distributed database system for a respective data block of the distributed database system (in particular frequently referred to as "previous block hash" in specialist literature). This in particular involves an applicable concatenation checksum being formed for the applicable preceding data block. The concatenation checksum used can be for example a transaction checksum or the data block checksum of a data block (that is to say an existing data block of the distributed database system), in order to concatenate a new data block with an (existing) data block of the distributed database system. It is, by way of example, alternatively possible for a checksum to be formed for a header of the preceding data block or for all of the preceding data block and used as concatenation checksum. This can, by way of example, also be calculated for multiple or all preceding data blocks. It is, by way of example, also feasible for the concatenation checksum to be formed for the header of a data block and the data block checksum. However, a respective data block of the distributed database system comprises a respective concatenation checksum that was calculated for or relates to a preceding data block, in particular even more the directly preceding data block, of the respective data block.

The data stored in a transaction of a data block, for example, can, in particular, be provided in different ways. Instead of the data, e.g., user data such as measurement data or data/ownership relationships pertaining to assets, a transaction of a data block can comprise only the checksum for these data, for example. The applicable checksum can be produced in various ways. This can be e.g., an applicable data block checksum of a data block (containing the applicable data) of another database or of the distributed database system, a transaction checksum of a data block containing the applicable data (of the distributed database system or of another database) or a data checksum that was formed using the data. Additionally, the applicable transaction can also comprise a reference to or an indication of a memory location (e.g., an address of a file server and details as to where the applicable data can be found on the file server; or an address of another distributed database that comprises the data). The applicable data could then, by way of example, also be provided in another transaction of a further data block of the distributed database system (e.g., if the applicable data and the associated checksums are contained in different data blocks). It is, by way of example, alternatively conceivable for these data to be provided via another communication channel (e.g., via another database and/or a cryptographically secured communication channel). It is also possible, by way of example, for, in addition to the checksum, an additional data record (e.g., a reference to or an indication of a memory location) to be stored in the applicable transaction, in particular indicating a memory location from which the data can be retrieved. This is in particular advantageous for keeping a data size of the blockchain or distributed database system as small as possible.

Within the context of embodiments of the invention, "concatenation of (the) data blocks of a distributed database system" can be understood to mean for example that data blocks each comprise information (e.g., concatenation checksum) referring to or referencing another data block or multiple other data blocks of the distributed database system.

Within the context of embodiments of the invention, "insertion into the distributed database system" and the like can be understood to mean for example that, in particular, a transaction or the transactions or a data block with its transactions is conveyed to one or more nodes of a distributed database system. If these transactions are for example validated successfully (e.g., by the node/s), these transactions are in particular concatenated as a new data block with at least one existing data block of the distributed database system. For this purpose, the applicable transactions are stored for example in a new data block.

Within the context of embodiments of the invention, "transaction" or "transactions" can be understood to mean for example a smart contract, a data structure or a transaction data record that, in particular, each comprise one of the transactions or multiple transactions. Within the context of embodiments of the invention, "transaction" or "transactions" can also be understood to mean for example the data of a transaction of a data block of a blockchain. A transaction can in particular comprise a program code that provides a smart contract, for example. Alternatively, a transaction can, by way of example, be a data structure that stores data (e.g., the control instructions). A transaction can, by way of example, also be referred to as a message (that is to say a communication message storing data) or can be a message that e.g., stores applicable data (e.g., control instructions). Embodiments of the invention therefore allows applicable transactions or messages to be interchanged. Transactions can e.g., comprise the control instructions and/or contractual data and/or other data such as video data, user data, measurement data, etc.

Within the context of embodiments of the invention, a "distributed database system", which can also be referred to as a distributed database, can be understood to mean for example a locally distributed database, a blockchain, a distributed ledger, a distributed memory system, a distributed ledger technology (DLT) based system (DLTS), a cloud, a cloud service, a blockchain in a cloud or a peer-to-peer database. It is also possible, by way of example, for different implementations of a blockchain or DLTS to be used, such as e.g., a blockchain or DLTS that is implemented by a directed acyclic graph (DAG), a cryptographic puzzle, a hash graph or a combination of the implementation variants.

A "distributed database system" can also be understood to mean for example a distributed database system that has at least some of its nodes and/or devices and/or infrastructure implemented by a cloud. By way of example, the applicable components are implemented as nodes/devices in the cloud (e.g., as virtual nodes in a virtual machine). This can be accomplished by VM-ware, Amazon Web Services or Microsoft Azure, for example. On account of the high flexibility of the implementation variants explained, it is, in particular, also possible for sub-aspects of the implementation variants to be combined with one another, e.g., by using a hash graph as a blockchain, the blockchain itself e.g., also being able to be blockless.

A distributed database system can also be a distributed communication system for data interchange or a peer-2-peer communication system or a peer-2-peer application, for example. This can be a network or a peer-2-peer network, for example. A/the distributed database system can also be a local distributed database system and/or a local distributed communication system, for example.

Within the context of embodiments of the invention, "data block", which, in particular depending on context and implementation, can also be referred to as "link" or "block", can be understood to mean for example a data block of a distributed database system (e.g., a blockchain or a peer-to-peer database) that is, in particular, implemented as a data structure and in each case comprises one of the transactions or several of the transactions. In one implementation, the database (or the database system) can be a DLT based system (DLTS) or a blockchain and a data block can be a block of the blockchain or of the DLTS, for example. A data block can comprise details pertaining to the size (data size in bytes) of the data block, a data block header (block header), a transaction counter and one or more transactions, for example. A data block can, by way of example, also be just a specific memory area or address area for the total data stored in the distributed database system.

Within the context of embodiments of the invention, a "blockchain node", "node", "node of a distributed database system" and the like can be understood to mean for example devices (e.g., field devices), computers, smartphones, clients or subscribers that perform operations for (with) the distributed database system (e.g., a blockchain). Such nodes can, by way of example, execute transactions of a distributed database system or the data blocks thereof or insert or concatenate new data blocks with new transactions into the distributed database system by new data blocks.

The devices (e.g., the applicable device) are for example devices of a technical system and/or industrial installation and/or of an automation network and/or of a production installation that are in particular also a node of the distributed database system. The devices in this instance can be for example field devices or devices in the Internet of Things that are in particular also a node of the distributed database system. Nodes can, by way of example, also comprise at least one processor, e.g., in order to perform their computer-implemented functionality.

Within the context of embodiments of the invention, a "technical system" can be understood to mean for example a device or multiple devices that are communicatively connected to one another and/or to a distributed database system (e.g., the first distributed database system).

Within the context of embodiments of the invention, a "state" or "status", e.g., a local state or a global state, can be understood to mean the status of transactions or the status of the distributed database/blockchain regarding at least part of the dataset stored/managed by the distributed database.

Within the context of embodiments of the invention, "node-specific status information" or "node-specific state information" can be understood to mean for example status information concerning at least part of the dataset and/or at least one transaction provided by one specific node. The node-specific status information can for example be digitally signed by the respective node. In particular, in case of a sharded database, the node-specific state information is related to a respective part of a dataset partly stored on said node.

Within the context of embodiments of the invention, "verifying a state" can be understood as checking a provided status information provided by matching said status information with status information or a state of at least one other node. Such check may either result in consensus concerning the reviewed state or in non-conformity and respective transactions related to said state are rolled back.

The present invention provides a hierarchical consensus method. The disclosed method allows reaching consensus first for individual subsets of a decentralized distributed database in order to reach consensus on the global level based on the status information of the individual subsets. The present method is particularly suited for a distributed database system, wherein data of a block is sharded across nodes of the database and each node is part of a network's shard storage. Each current state of data in a subset can be described as a local state. So called main nodes of the database store the complete dataset or at least information about the complete dataset. A current state in the global decentralized distributed database can be called global state.

This invention accelerates the process of reaching/finding consensus for the distributed database system. If the number of nodes in a system is "n", the performance of BFT is of the order of $O(n.logn)$. Since this invention does not require all the n nodes to communicate to/share data with each other, but rather a subset of them, the order comes down to an order of $O(n.logn)$.

According to an embodiment of the computer-implemented method the first local state for each subset can be determined by
  randomly selecting a node from the respective subset of nodes,
  receiving node-specific status information of the selected node by the remaining nodes of the subset,
  verifying the node-specific status information of the selected node through matching this status information with respective status information of the remaining nodes and generating a verification result
and
  outputting the status information of the selected node as first local state depending on the previously generated verification result.

These method steps can be understood as detailed steps of the method step (b) described above. Selection is for example defined by a given governance mechanism governing the communication and verification between nodes. Such governance mechanism can for example maintain a list of all participating nodes of the distributed database to identify subsets of nodes and main nodes according to a sharded dataset information. A respective node can for example be identified by a tag or label assigned by the governance mechanism.

According to a further embodiment of the computer-implemented method verifying the first combined state can be performed by all main nodes or by one randomly selected main node.

In order to reach global consensus, the provided first combined state can be either matched with the global state by only one main node or by all main nodes.

According to a further embodiment, the method may further comprise the steps:
  providing a second local state for each subset of nodes, wherein the second local state is determined based on status information of a randomly selected node from a subset other than the node selected for determining the first local state,
  determining a second combined state by combining the second local states of all subsets,
  verifying the second combined state by matching the second combined state with the global state and/or with the first combined state and generating a verification result,
and
  outputting the second combined state as the valid global state depending on the previously generated verification result.

This additional combined state can be understood as a further independent check or plausibility check of the global status. It is further possible to determine analogously a third to n-th combined state to perform further independent checks. Such additional check ensures credibility of the global valid state.

According to a further embodiment of the computer-implemented method, in case of a mismatch between the first combined state and the global state, a new first combined state can be determined and verified until consensus is reached.

Malicious or corrupt nodes can hence be identified, e.g., based on the node-specific status information, and their state information can be replaced by another. As a consequence of a mismatch, a corresponding transaction is sent and rolled back.

According to an alternative embodiment of the computer-implemented method, in case of a mismatch between the second combined state and the global state, a new second combined state can be determined and verified until consensus is reached.

According to an alternative embodiment of the computer-implemented method, in case of a mismatch between the first combined state and the global state and/or between the second combined state and the global state different main nodes can be selected to determine a new global state.

In case one of the main nodes is corrupt, a consensus might not be reached, and a transaction might be constantly cancelled. In such case, the governance mechanism can observe this behavior and propose new, alternative main nodes to verify the particular local state.

According to a further embodiment of the computer-implemented method, in case of a mismatch between the first combined state and the global state and/or between the second combined state and the global state the subset according to the mismatch is identified and at least one transaction is rolled back for that subset.

Hence, not all transactions concerning the whole dataset must be rolled back but only the respective transaction for a corrupt subset.

According to a further embodiment of the invention the distributed database can be a blockchain.

In addition, a computer program product (non-transitory computer readable storage medium having instructions, which when executed by a processor, perform actions) having program instructions for performing the aforementioned methods according to embodiments of the invention is claimed, wherein one of the methods according to embodiments of the invention, all of the methods according to embodiments of the invention or a combination of the methods according to embodiments of the invention is performable by the computer program product each time.

The invention provides according to a further aspect a distributed database, a decentralized distributed database, comprising main nodes, each main node storing a dataset, and a plurality of subsets of nodes, each subset storing a part of the dataset, configured to perform a consensus method according to one of the method steps according to the invention obtaining a valid global state of the distributed database.

The distributed database, in particular a decentralized distributed database, comprises a shard storage mechanism to distribute shards of the dataset among nodes.

The invention provides according to a further aspect a broadcasting node, wherein the broadcasting node belongs to a subset of nodes of a distributed database, each node of the subset configured to store part of a dataset which is completely stored in at least one further node of the distributed database,
comprising
- a first interface configured to receive a request for providing a node-specific status information regarding the stored part of the dataset,
- a status module configured to provide the node-specific status information regarding the stored part of the dataset,
- a second interface configured to broadcast the node-specific status information to the remaining nodes of the subset.

The invention provides according to a further aspect a verification node, wherein the verification node belongs to a subset of nodes of a distributed database, each node of the subset configured to store part of a dataset which is completely stored in at least one further node of the distributed database,
comprising
- an interface configured to receive a node-specific status information regarding the stored part of the dataset, from another, randomly selected, node of the subset,
- a verification module configured to verify the received node-specific status information through matching this node-specific status information with a status information of the verification node regarding the stored part of the dataset and configured to generate a verification result,
- an output module configured to output the generated verification result for providing the status information as a first local state for the subset depending on the previously generated verification result.

The broadcasting node and the verification node can hence be understood as sender and receiver of a status information, respectively, in order to obtain a valid state for the distributed database.

BRIEF DESCRIPTION

Some of the embodiments will be described in detail, with reference to the following figures, wherein like designations denote like members, wherein.

DETAILED DESCRIPTION

Moreover, in particular a (relevant) person skilled in the conventional art, with knowledge of the method claim/method claims, is of course aware of all routine options for realizing products or options for implementation in the conventional art, and so there is no need in particular for independent disclosure in the description. In particular, these customary realization variants known to a person skilled in the art can be realized exclusively by hardware (components) or exclusively by software (components). Alternatively and/or additionally, a person skilled in the art, within the scope of his/her expert ability, can choose to the greatest possible extent arbitrary combinations according to embodiments of the invention of hardware (components) and software (components) in order to implement realization variants according to embodiments of the invention.

In particular, in view of the high number of different realization options, it is impossible and also not helpful or necessary for the understanding of embodiments of the invention to name all these realization options. In this respect, in particular all the exemplary embodiments below are intended to demonstrate merely by way of example a few ways in which in particular such realizations of the teaching according to embodiments of the invention could be manifested.

Consequently, in particular the features of the individual exemplary embodiments are not restricted to the respective exemplary embodiment, but rather relate in particular to embodiments of the invention in general. Accordingly, features of one exemplary embodiment can also serve as features for another exemplary embodiment, in particular without this having to be explicitly stated in the respective exemplary embodiment.

Figure 1:
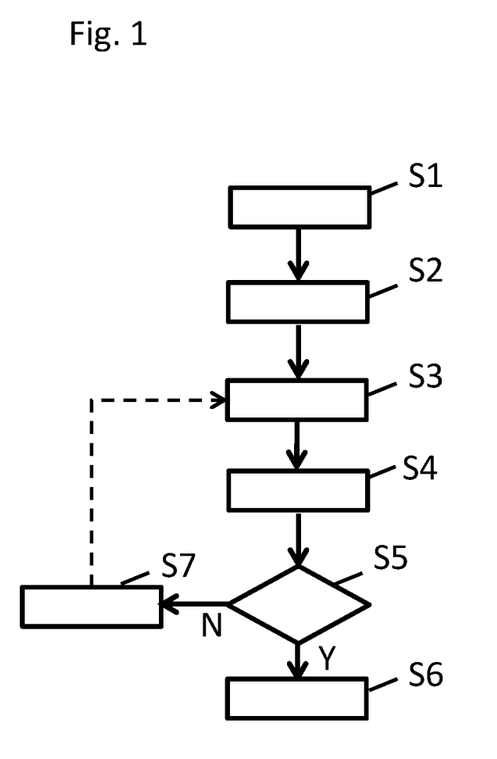
FIG. 1 shows a first exemplary embodiment of the invention.

FIG. 1 shows a first exemplary embodiment of the invention. It shows a flow chart illustrating steps of a consensus method for obtaining a valid global state of a distributed database system, in particular, a sharded decentralized distributed database.

The distributed database comprises a plurality of nodes or devices storing information in a decentralized manner. A dataset for example can be stored in at least part of these nodes. Particularly, in case of a sharded storage, parts/shards of the dataset are stored in separate subsets of nodes. In other words, the dataset can be divided in separate parts of the datasets, wherein these separate parts are stored only in subsets of nodes. The distributed database system therefore comprises a shard storage mechanism to distribute and/or manage (data) shards of the dataset among nodes. Transactions regarding this part of the dataset are for example only processed by the respective nodes of the subset. Hence, a subset of node can be defined based on the stored shard of the dataset. The nodes of the distributed database can therefore be grouped in such subsets of nodes and in addition in main nodes wherein the main nodes store the complete dataset.

The dataset or at least information about the dataset is hence stored in a decentralized manner among the nodes of the distributed database system. Before a valid state regarding the dataset can be provided, the nodes try to reach consensus about the dataset and/or the state of the dataset. After consensus is reached, the respective state and/or information about said state can be inserted into the distributed database. For example, in case the distributed database is realized as a blockchain, after consensus is reached, respective validated transactions can be concatenated and inserted as a new block of the blockchain.

Each node can provide a node-specific state information on the dataset or part of the dataset. As some nodes only store data related to specific use-cases allocated to these nodes, they do not possess full information to participate in the global state of consensus. In order to obtain a global consensus for the distributed database regarding said dataset, the following steps are performed:

In step S1 a request for providing a valid global state of the distributed database is received. Such a request can be provided either at specified points in time or triggered through an event. Hence, status information shall be provided on the dataset and/or transactions regarding the dataset. When at a given time, there is a request for a state of the decentralized distributed database, the state is stored in genesis block and replicated across all nodes. At any time in future, when the consensus is requested a governance mechanism identifies all the different subsets of the nodes which are participating in different use cases.

In step S2 a first local state is determined for each subset based on status information of nodes of the respective subset regarding the respective part of the subset.

For each subset, a randomly selected node of said subset provides a node-specific status information regarding the respective dataset shard and broadcasts this status information to all remaining nodes of said subset. The remaining nodes of the subset verify the provided status information by matching it with their respective status information. In other words, the remaining nodes vote on the provided status information. In case of a match, i.e., consensus, the provided status information of the selected node is outputted as first local state for the respective subset of nodes. These substeps of step S2 are performed for each subset of nodes outputting first local states for all subsets.

The next step S3 comprises combining all first local states of all subsets to a first combined state. As the dataset is sharded among the subsets of nodes, said combined state comprises information about the complete dataset stored in the distributed database.

In the next step S4 a global state is determined by all main nodes of the distributed database system. As the main nodes store information about the complete dataset, the main nodes can propose a global state for the distributed database based on said information.

In the next step S5 the first combined state and the global state are matched in order to verify the first combined state. The verification can for example be performed by all main nodes or merely by one randomly selected node.

A discrepancy might occur for example if a node is corrupted and/or the proposed/broadcasted state of this node is corrupted or contains wrong information. In case of a mismatch/discrepancy between the first combined state and the global state, path N, a corresponding transaction is sent and rolled back, or the calculation of said transaction is repeated. Furthermore, step S7 is performed, wherein a new first combined state is determined and verified until consensus is reached. Therefore, step S3 to S5 can be repeated at least once until consensus is reached, wherein different nodes for providing first local states are selected in each subset.

In case of consensus, path Y, the first combined state is outputted as global valid state for the distributed database. Then this global valid state or at least information about it can be stored in a new block of the distributed database.

Figure 2:
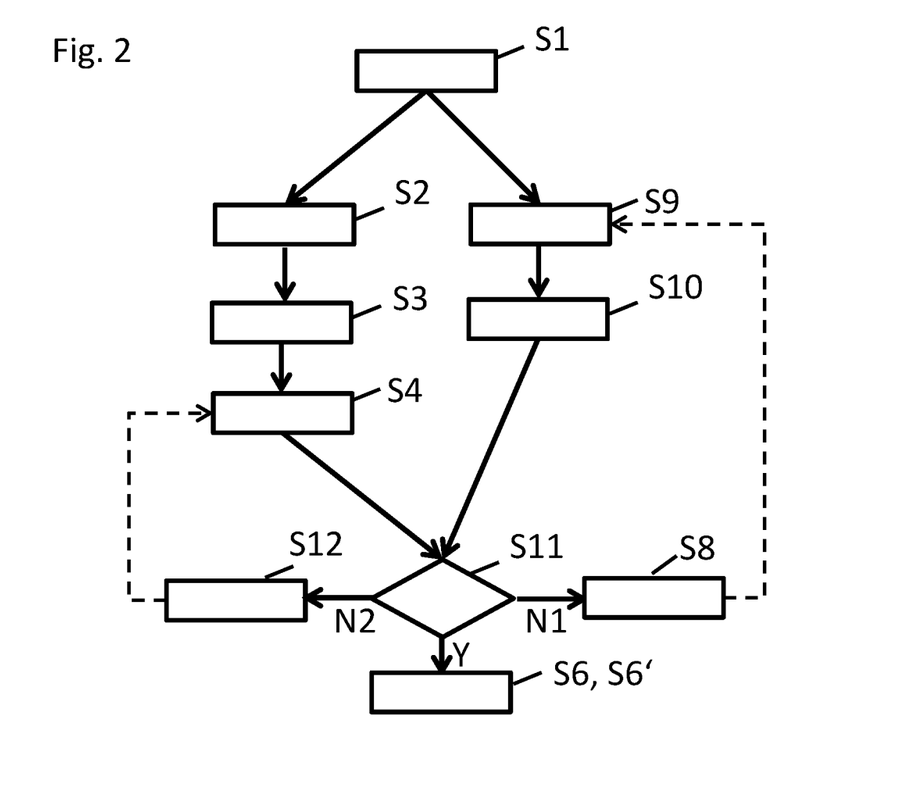
FIG. 2 shows a second exemplary embodiment of the invention.

FIG. 2 shows another flow chart illustrating an exemplary embodiment of the invention. It shows further method steps of the consensus method which can be executed in addition to the method steps already described on the basis of FIG. 1.

Depending on a request for providing a valid global state of a distributed database, step S1, states of subsets of nodes of the distributed database are provided, step S2. The database comprises main nodes, each main node storing a complete dataset, and a plurality of subsets of nodes, each subset configured to store a part of the dataset.

In step S2 and S3, first local states for each subset based on status information of nodes of the respective subset regarding the respective part of the stored dataset are determined in order to provide a first combined state for the distributed database. In addition, a global state is determined by the main nodes, step S4.

In step S9 and S10, which can be performed in parallel or simultaneously to step S2 to S4, a second combined state is determined: In step S9, for each subset of nodes a second local state is determined based on status information of a randomly selected node from a subset, wherein the node is different than the node selected for determining the first local state. These second local states are combined to form the second combined state, step S10.

In the next step S11, the second combined state is verified by matching the second combined state with the proposed global state and/or the first combined state and a verification result is generated.

Based on the generated verification result, the second combined state is outputted as the valid global state. In case of a match with the global state and the first combined state, path Y, the second global state is outputted as valid global state.

In case of a mismatch between the second combined state and the first combined state or the global state, case N1, a new second combined state is determined and verified until consensus is reached.

In case of a mismatch between the first combined state and the global state and/or between the second combined state and the global state, path N2, different main nodes are selected to determine a new global state until consensus is reached.

Figure 3:
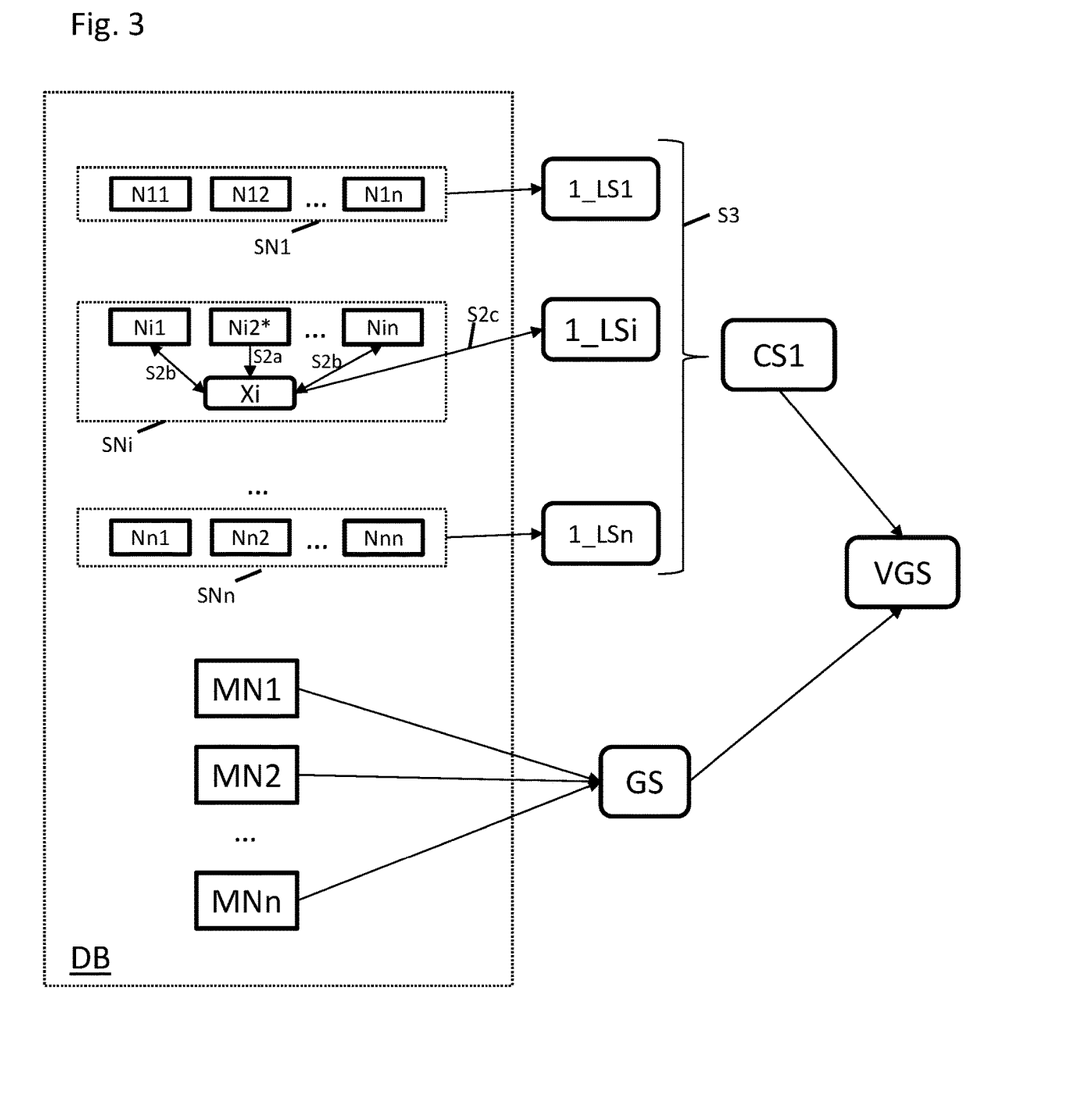
FIG. 3 shows a third exemplary embodiment of the invention.

FIG. 3 shows a further exemplary embodiment of the invention. It illustrates schematically a decentralized distributed database DB comprising main nodes MN1, MN2, . . . , MNn as well as subset of nodes SN1, . . . , SNi, . . . , SNn. Data storage in the distributed database can be managed by a shard storage method. Hence, a subset of nodes can be defined by a shard of the dataset stored merely on the nodes of said subset. With that setup, different use cases or different parts of the dataset can be separately managed. The main nodes of the database comprise information about the complete dataset. Hence, the main nodes can act as a watchdog for these subsets, as they are part of all subsets.

The distributed database can be realized as a blockchain. Therefore, each block in the blockchain comprises the dataset, information about the dataset and/or the status of the dataset. For a distributed database with a sharded architecture, each block comprises the complete data and/or information about the dataset.

If a request for obtaining a global valid state GVS for the distributed database DB is received, a hierarchical consensus method is performed comprising the following steps:

Each subset SN1, . . . , SNn provides a first local state 1_LS1, . . . , 1_LSi, . . . , 1_LSn. For each subset, the following steps are performed, exemplary shown for subset SNi. Firstly, one node of the subset is randomly selected, e.g., node Ni2*. This selected node Ni2* acts as broadcasting node and provides, S2a, a node-specific status information Xi regarding the respective part of the dataset which is stored by this subset SNi. The node-specific status information Xi is in particular assigned to said node Ni2*, i.e., by for example an identifier the status information Xi can be uniquely assigned to said node Ni2*. Alternatively or additionally the node-specific status information Xi is digitally signed by said node Ni2*. Hence, it is possible to trace back said status information Xi to said respective node Ni2*. If later said status information turns out to be corrupted, all transactions processed by said node Ni2* can be rolled back.

The provided node-specific status information Xi is verified, S2b, by the remaining nodes Ni1, . . . , Nth, of the subset except the broadcasting node Ni2*. Hence, the remaining nodes Ni1, . . . , Nth act as verification nodes. In case of a match, a first local state 1_LSi for said subset is outputted based on the status information Xi.

All first local states 1_LS1, . . . , 1_LSi, . . . , 1_LSn are combined, step S3, to form a first combined state CS1. The main nodes, in parallel, propose a global state GS based on information about the complete dataset.

In order to provide a global valid state GVS, the first combined state CS1 is verified by the global state GS. For example, the main nodes match the first combined state CS1 with the global state GS and generate a verification result. The first combined state CS1 is outputted as the valid global state VGS depending on that verification result.

Figure 4:
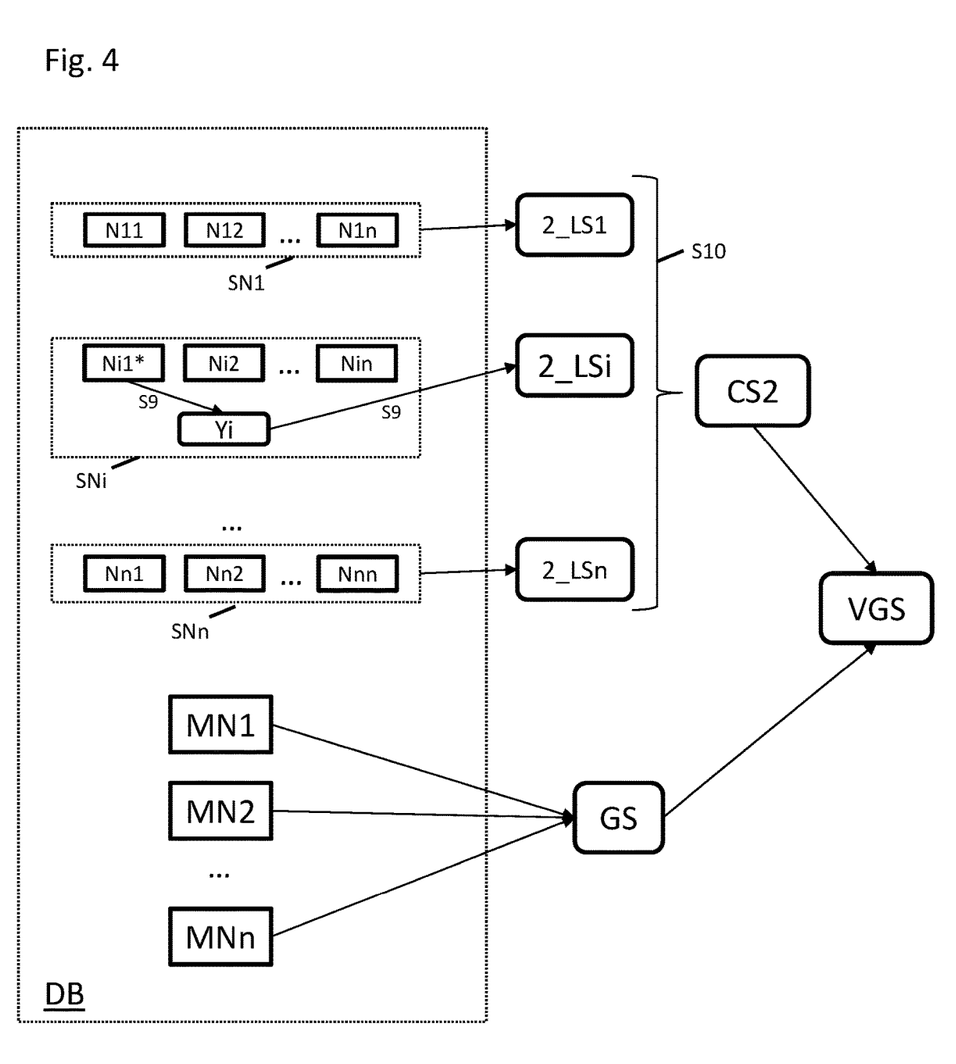
FIG. 4 shows a fourth exemplary embodiment of the invention.

FIG. 4 shows another exemplary embodiment of the invention. A similar setup as in FIG. 3 is shown. In addition to generate a first combined state (not shown), as shown in FIG. 3, a second combined state CS2 is determined. The second combined state CS2 serves as an additional verification check.

For each subset of nodes SN1, . . . , SNi, SNn a second local state 2_LS1, . . . , 2_LSi, . . . , 2LSn is determined, respectively. As exemplary shown for subset SNi, the second local state 2_LSi is determined based on a node-specific status information Yi from a randomly selected node Ni1* from this subset, wherein the node is different from the node used for determining the first local state of the subset, see FIG. 3. The second local states 2_LS1, . . . , 2LSi, . . . , 2LSn are combined to form the second combined state CS2. The combination can be an accumulation of all transactions and a subsequent recording of them.

The second combined state CS2 is then verified by matching it with a global state GS provided by the main nodes MN1, . . . , MNn. In case of a positive verification result, the second combined state CS2 can be outputted as valid global state VGS for the distributed database.

Figure 5:
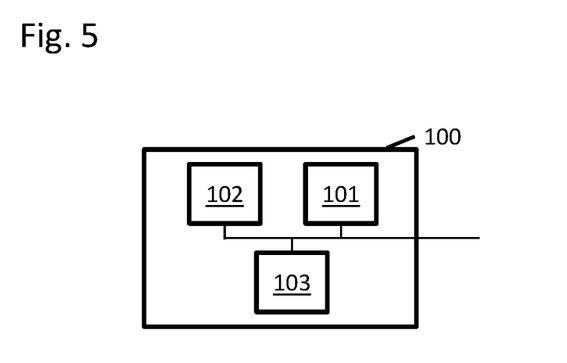
FIG. 5 shows an exemplary embodiment of a broadcasting node.

FIG. 5 shows an exemplary embodiment of a broadcasting node 100 according to the invention. The broadcasting node 100 comprises a first interface 101, a status module 102, and a second interface 103. These components are all interconnected.

The broadcasting node 100 belongs to a subset of nodes of a distributed database, each node of the subset configured to store part of a dataset which is completely stored in at least one further node of the distributed database.

The first interface 101 is configured to receive a request for providing a node-specific status information regarding the stored part of the dataset. This request is in particular triggered by a request for providing a valid global state for the distributed database.

The status module 102 is configured to provide the node-specific status information regarding the stored part of the dataset. The status module 102 therefore provides information about the status of the partly stored dataset. Said information is node-specific, i.e., it can be assigned to the broadcasting node and/or digitally or cryptographically signed by it.

The second interface 103 is configured to broadcast the node-specific status information to the remaining nodes of the subset. The broadcasting node 100 can be connected to a network, the network comprising a plurality of nodes forming the distributed database. Hence, the broadcasting node 100 can transmit, via the network, the status information to a verification node for verifying the status information.

Figure 6:
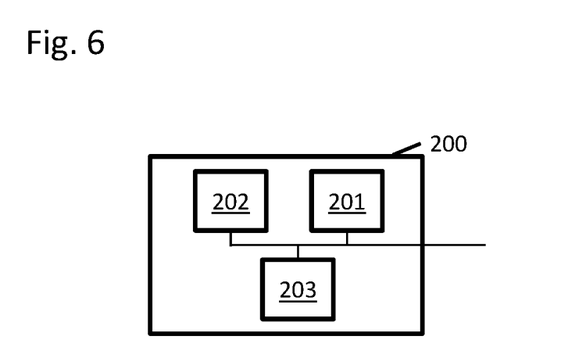
FIG. 6 shows an exemplary embodiment of a verification node.

FIG. 6 shows an exemplary embodiment of a verification node 200 according to the invention, wherein the verification node belongs to a subset of nodes of a distributed database, each node of the subset configured to store part of a dataset which is completely stored in at least one further node of the distributed database. The verification node 200 can be connected, via a network, to a broadcasting node of the distributed database, in particular to a broadcasting node of the same subset.

The verification node 200 comprises an interface 201 configured to receive a node-specific status information regarding the stored part of the dataset, from another, randomly selected, node of the subset, e.g., a broadcasting node as shown in FIG. 5.

The verification node 200 further comprises a verification module 202 which is configured to verify the received node-specific status information through matching this node-specific status information with a status information of the verification node regarding the stored part of the dataset and configured to generate a verification result.

Furthermore, the verification node comprises an output module 203 which is configured to output the generated verification result for providing the status information as a first local state for the subset depending on the previously generated verification result.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented consensus method for obtaining a valid global state for a distributed database, wherein the distributed database comprises main nodes, each main node storing a complete dataset, and a plurality of subsets of nodes, each subset configured to store a part of the dataset, the method comprising:

a. receiving a request for providing the valid global state of the distributed database;

b. determining by each subset of nodes a first local state for each subset based on status information of nodes of the respective subset regarding the respective part of the dataset;

c. combining the first local state of all subsets to a first combined state;

d. determining a global state by the main nodes based on status information of the main nodes regarding the stored dataset;

e. verifying the first combined state by matching the first combined state with the global state generating a verification result;

and f. outputting the first combined state as the valid global state for the distributed database depending on the previously generated verification result.

2. The computer-implemented method according to claim 1, wherein the first local state for each subset is determined by:

randomly selecting a node from the respective subset of nodes;

receiving node-specific status information of the selected node by the remaining nodes of the subset;

verifying the node-specific status information of the selected node through matching the status information with respective status information of the remaining nodes and generating a verification result;

and outputting the status information of the selected node as the first local state depending on the previously generated verification result.

3. The computer-implemented method according to claim 1, wherein verifying the first combined state is performed by all main nodes or by one randomly selected main node.

4. The computer-implemented method according to claim 1, further comprising:

providing a second local state for each subset of nodes, wherein the second local state is determined based on status information of a randomly selected node from a subset other than the node selected for determining the first local state;

determining a second combined state by combining the second local states of all subsets;

verifying the second combined state by matching the second combined state with the global state and/or with the first combined state and generating a verification result;

and outputting the second combined state as the valid global state depending on the previously generated verification result.

5. The computer-implemented method according to claim 1, wherein in case of a mismatch between the first combined state and the global state a new first combined state is determined and verified until consensus is reached.

6. The computer-implemented method according to claim 1, wherein in case of a mismatch between the second combined state and the global state a new second combined state is determined and verified until consensus is reached.

7. The computer-implemented method according to claim 1, wherein in case of a mismatch between the first combined state and the global state and/or between the second combined state and the global state different main nodes are selected to determine a new global state.

8. The computer-implemented method according to claim 1, wherein in case of a mismatch between the first combined state and the global state and/or between the second combined state and the global state the subset according to the mismatch is identified and at least one transaction is rolled back for that subset.

9. The computer-implemented method according to claim 1, wherein the distributed database is a blockchain.

10. A computer program product, comprising a computer readable hardware storage device having computer readable program code stored therein, said program code executable by a processor of a computer system to implement a method according to claim 1 when the computer program product is run on a computer.

11. A distributed database comprising main nodes, each main node storing a dataset, and a plurality of subsets of nodes, each subset storing a part of the dataset, configured to perform a consensus method according to claim 1 for obtaining a valid global state of the distributed database.

* * * * *